United States Patent [19]

McCrea

[11] Patent Number: 5,431,430
[45] Date of Patent: Jul. 11, 1995

[54] HYDRAULIC SWAY CONTROL AND MOTION DAMPENING MECHANISM

[75] Inventor: James A. McCrea, 295 Park Ave., Long Beach, Calif. 90803

[73] Assignee: James A. McCrea, Long Beach, Calif.

[21] Appl. No.: 224,727

[22] Filed: Apr. 8, 1994

Related U.S. Application Data

[63] Continuation-in-part of Ser. No. 174,439, Dec. 28, 1993.

[51] Int. Cl.$^6$ .............................................. B60G 21/00
[52] U.S. Cl. ..................................... 280/689; 280/772
[58] Field of Search ............... 280/689, 703, 772, 6.11

[56] References Cited

U.S. PATENT DOCUMENTS

| | | | |
|---|---|---|---|
| 4,607,861 | 8/1986 | Eisenberg et al. | 280/689 |
| 4,667,978 | 5/1987 | Asami et al. | 280/6.11 |
| 4,872,701 | 10/1989 | Akatsu et al. | 280/703 |

FOREIGN PATENT DOCUMENTS

| | | | |
|---|---|---|---|
| 1942427 | 4/1970 | Germany | 280/703 |
| 2232636 | 1/1973 | Germany | 280/703 |
| WO93/01948 | 2/1993 | WIPO | 280/6.11 |

Primary Examiner—Kenneth R. Rice

[57] ABSTRACT

The mechanism is designed to control two critical performance characteristics of an automobile. The first is body roll or sway. The mechanism will counteract both the side to side roll and the forward roll encountered while cornering. In addition, the mechanism will counteract the forward roll encountered during braking. The amount of body roll allowed by the mechanism can be easily and precisely adjusted to optimize performance. The second performance characteristic is motion dampening. The mechanism acts to dampen an automobiles suspension during expansion of the suspension only. The amount of dampening can be easily and precisely adjusted to optimize performance. Adjustments can even be made by the driver during operation of the automobile.

2 Claims, 2 Drawing Sheets

HYDRAULIC SWAY CONTROL AND MOTION DAMPENING MECHANISM

This application is a continuation-in-part of application Ser. No. 08/174,439, filed Dec. 28, 1993, now pending.

FIELD OF INVENTION

High Performance Automobile Suspension Control Systems

BACKGROUND OF INVENTION

When installed, the Hydraulic Sway Control and Motion Dampening Mechanism will have many advantages over traditional suspension control mechanisms without the complexity of an active suspension system.

In the past, the most common way to control body roll has been with a sway bar mounted in-between the front or rear wheels. Subject invention offers a greatly improved method of controlling sway while providing the ability to easily and precisely adjust the amount of sway desired.

In addition, subject invention will have motion dampening characteristics similar to those of a shock absorber while providing the ability to easily and precisely adjust the amount of dampening desired.

SUMMARY OF INVENTION

Subject invention is designed to counteract body roll of an automobile. Mechanism utilizes hydraulics to determine the relative vertical displacement between the wheels in opposite corners of an automobile to determine the amount of body roll. Springs are then employed to oppose this displacement thus counteracting the body roll. In addition, throttling valves are employed to restrict the flow of the hydraulic fluid through the mechanism thus dampening the suspension of the automobile.

DESCRIPTION OF THE DRAWING

The objects and features of the invention can be better appreciated upon consideration of the attached drawings including.

DESCRIPTION OF THE INVENTION

Figure 1:
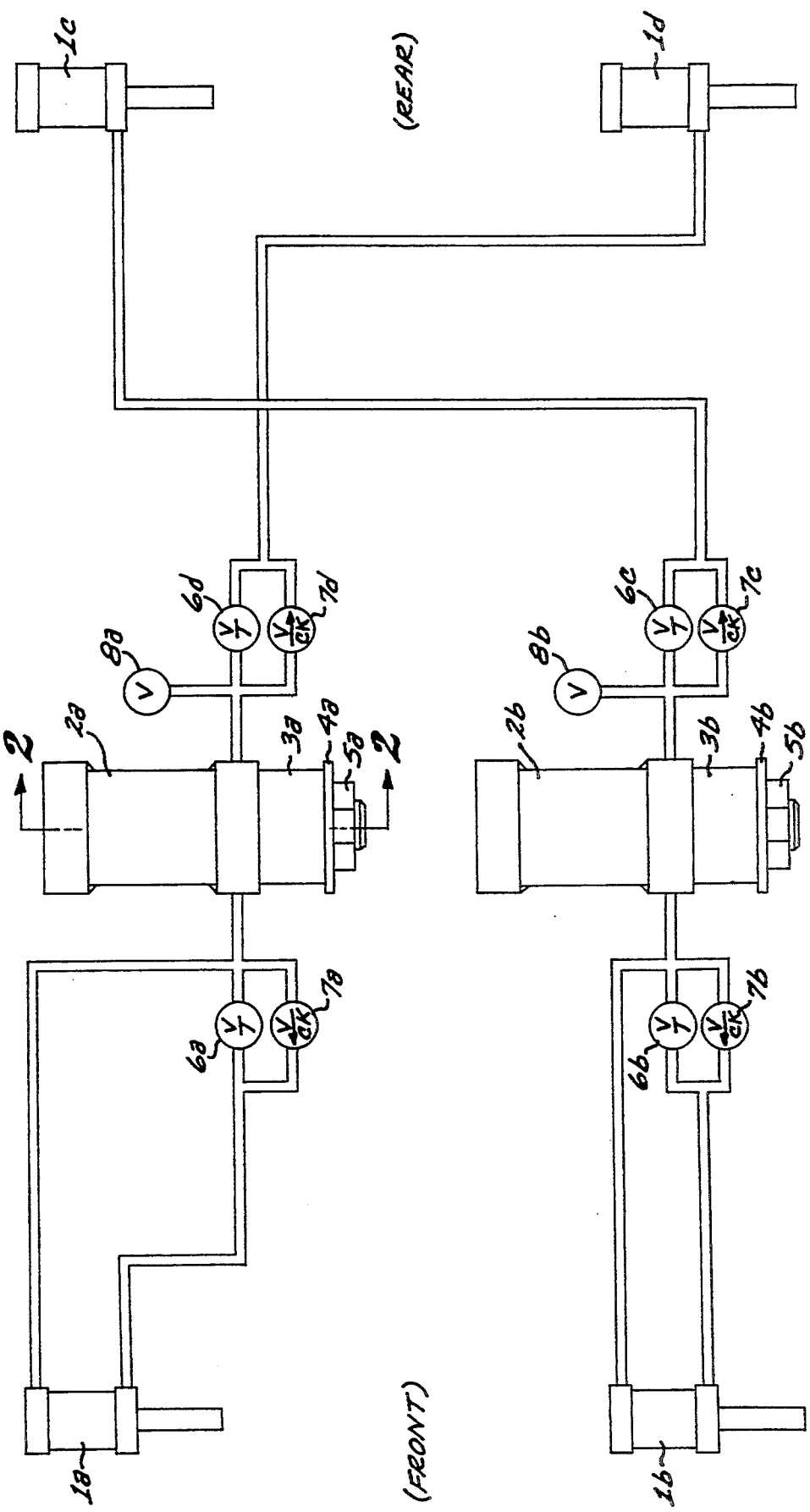
FIG. 1 depicting a layout of the entire mechanism including the relative positions of the components.
Figure 2:
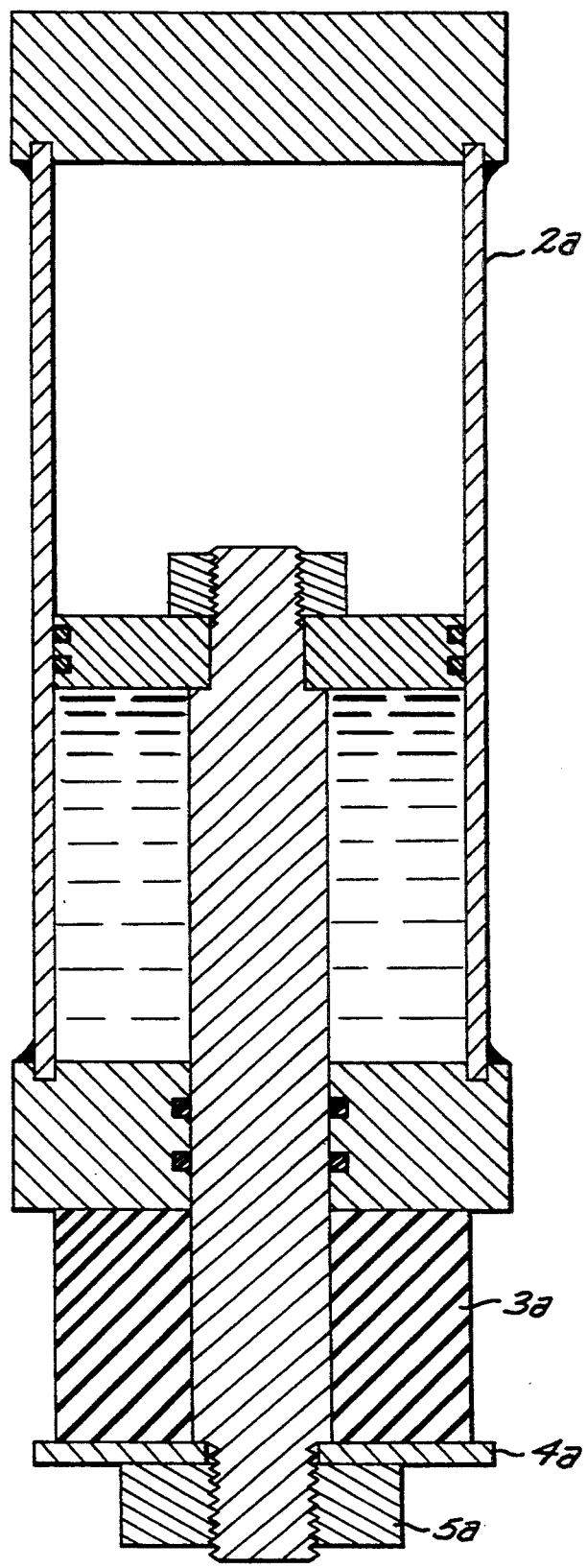
FIG. 2 depicting a cross sectional view of one of the primary components of the invention taken along section lines 2—2 of FIG. 1.

Components (1a–d) are single end, double acting hydraulic cylinders.

Hydraulic cylinder (1a) is mounted such that its piston will be displaced proportionately to any vertical displacement of the front fight wheel relative to the automobile chassis.

Hydraulic cylinder (1b) is mounted such that its piston will be displaced proportionately to any vertical displacement of the front left wheel relative to the automobile chassis.

Hydraulic cylinder (1c) is mounted such that its piston will be displaced proportionately to any vertical displacement of the rear right wheel relative to the automobile chassis.

Hydraulic cylinder (1d) is mounted such that its piston will be displaced proportionately to any vertical displacement of the rear left wheel relative to the automobile chassis.

In most cases, Hydraulic cylinders (1a–d) can be mounted in place of an automobile's existing shock absorbers or struts.

Components (2a, b) are single end, double acting hydraulic cylinders.

The lower chamber of hydraulic cylinder (2a) is piped to both the upper and lower chambers of (1a) and to the lower chamber of (1d).

The lower chamber of hydraulic cylinder (2b) is piped to both the upper and lower chambers of (1b) and to the lower chamber of (1c).

In order to properly describe subject invention, the chamber containing the shaft of the hydraulic cylinder shah be refer to as the lower chamber. It is not necessarily a requirement of the invention to mount the hydraulic cylinders vertically. High pressure tubing is preferred for all piping.

Components (3a,b) are Urethane springs in tubular form.

Spring (3a) fits snugly over the shaft protruding from hydraulic cylinder (2a) and is retained in place by way of washer (4a) and nut (5a).

Spring (3b) fits snugly over the shaft protruding from hydraulic cylinder (2b) and is retained in place by way of washer (4b) and nut (5b).

Components (6a–d) are needle throttling valves.

Throttling valve (6a) is installed in the piping from (2a) to the lower chamber of (1a).

Throttling valve (6b) is installed in the piping from (2b) to the lower chamber of (1b).

Throttling valve (6c) is installed in the piping from (2b) to (1c).

Throttling valve (6d) is installed in the piping from (2a) to (1d).

Components (7a–d) are check valves.

Check valve (7a) is installed in parallel with (6a) and is oriented such that flow is permitted from (2a) to the lower chamber of (1a) only.

Check valve (7b) is installed in parallel with (6b) and is oriented such that flow is permitted from (2b) to the lower chamber of (1b) only.

Check valve (7c) is installed in parallel with (6c) and is oriented such that flow is permitted from (2b) to (1c) only.

Check valve (7d) is installed in parallel with (6d) and is oriented such that flow is permitted from (2a) to (1d) only.

Components (8a, b) are block valves.

Valve (8a) is installed at the highest point on the piping from (2a).

Valve (8b) is installed at the highest point on the piping from (2b).

The upper and lower chambers of hydraulic cylinders (1a, b) and the lower chambers of hydraulic cylinders (1c, d) & (2a, b), along with all interconnecting piping and valves, are filled with hydraulic fluid through valves (8a, b). The installation of valves (8a, b) at the highest points in the piping allows the system to be properly vented

OPERATION OF THE INVENTION

Sway control

When cometing the automobile to the right, the chassis will roll both to the left and forward. This action will displace the front left wheel up relative to the chassis. In effect, the piston in hydraulic cylinder (1b) will be forced up which will, in turn, force hydraulic fluid from the upper chamber of (1b) into the lower chambers of (1b) and (2b). Additionally, the body roll will displace the rear right wheel down relative to the chassis. In effect, the piston in hydraulic cylinder (1c) will be forced down which will, in turn, force hydraulic fluid from the lower chamber of (1c) into the lower chamber of (2b). The combination of hydraulic fluid from (1b) and (1c) into (2b) will displace the piston in (2b) up. Urethane spring (3b) will resist this displacement and, in effect, oppose the displacement of (1 b,c) thus countering the roll of the chassis.

When cornering the automobile to the left, the chassis will roll both to the right and forward. This action will displace the front right wheel up relative to the chassis. In effect, the piston in hydraulic cylinder (1a) will be forced up which will, in turn, force hydraulic fluid from the upper chamber of (1a) into the lower chambers of (1a) and (2a). Additionally, the body roll will displace the rear left wheel down relative to the chassis. In effect, the piston in hydraulic cylinder (1d) will be forced down which will, in turn, force hydraulic fluid from the lower chamber of (1d) into the lower chamber of (2a). The combination of hydraulic fluid from (1a) and (1d) into (2a) will displace the piston in (2a) up. Urethane spring (3a) will resist this displacement and, in effect, oppose the displacement of (1a,d) thus countering the roll of the chassis.

During braking of the automobile, the chassis will roll forward. This action will displace the from wheels up relative to the chassis. In effect, the pistons in hydraulic cylinders 1a,b) will be forced up which will, in turn, force hydraulic fluid from the upper chambers of (1a, b) into the lower chambers of (1a,b) and the lower chambers of (2a,b). Additionally, the body roll will displace the rear wheels down relative to the chassis. In effect, the pistons in hydraulic cylinders (1d,b) will be forced down which will, in turn, force hydraulic fluid from the lower chambers of (1d,c) into the lower chambers of (2a,b). The combination of hydraulic fluid from (1a,b) and (1d,c) into (2a,b) will displace the pistons in (2a,b) up. Urethane springs (3a,b) will resist this displacement and, in effect, oppose the displacement of (1a–d) thus countering the roll of the chassis.

Motion dampening

When the pistons in hydraulic cylinders (1a–d) are displaced up, hydraulic fluid will be forced through check valves (7a–d) respectively. However, when the pistons in hydraulic cylinders (1a–d) are displaced down, check valves (7a–d) will close thus forcing hydraulic fluid through throttling valves (6a–d) respectively. The throttling valves will act to dampen the flow and, in turn, dampen the suspension of the automobile.

I claim:

1. A hydraulic mechanism designed to counteract rolling forces imposed on an automobile chassis, the mechanism comprising: a single ended hydraulic cylinder mounted in the front left region of an automobile such that its piston will be displaced proportionately to any vertical displacement of the front left wheel relative to the chassis; a single ended hydraulic cylinder mounted in the front fight region of said automobile such that its piston will be displaced proportionately to any vertical displacement of the front right wheel relative to the chassis; a single ended hydraulic cylinder mounted in the rear left region of said automobile such that its piston will be displaced proportionately to any vertical displacement of the rear left wheel relative to the chassis; a single ended hydraulic cylinder mounted in the rear right region of said automobile such that its piston will be displaced proportionately to any vertical displacement of the rear right wheel relative to the chassis; a single ended hydraulic cylinder with a spring retained on its shaft piped to the hydraulic cylinders mounted in both the front left region and the rear right region of said automobile; a single ended hydraulic cylinder with a spring retained on its shaft piped to the hydraulic cylinders mounted in both the front fight region and the rear left region of said automobile.

2. A hydraulic mechanism designed to dampen the suspension of said automobile comprising the invention in claim 1 further including throttling valves and check valves mounted in the piping between the single ended hydraulic cylinders.

* * * * *